Figure 1:
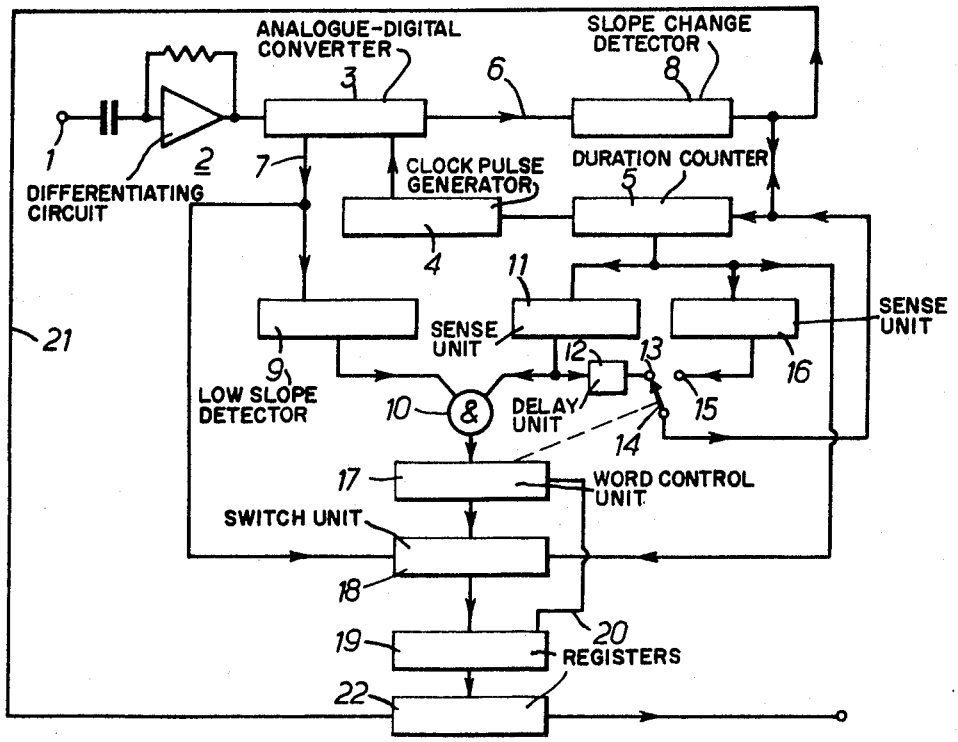

United States Patent [19]

Ellis

[11] 3,749,834

[45] July 31, 1973

[54] SYSTEM FOR PROCESSING SLOPE AND DURATION INFORMATION CONTAINED IN COMPLEX WAVEFORMS

[75] Inventor: Alfred Brian Edwin Ellis, Chelmsford, England

[73] Assignee: The Marconi Company, Limited, London, England

[22] Filed: May 11, 1971

[21] Appl. No.: 142,414

Related U.S. Application Data

[63] Continuation-in-part of Ser. No. 822,401, May 7, 1969.

[30] Foreign Application Priority Data

May 13, 1968 Great Britain.................. 22,505/68

[52] U.S. Cl.................. 178/66, 325/38 R, 325/141, 325/142, 325/322, 325/325, 328/111, 328/114, 328/118, 328/119, 329/106, 332/11 R

[51] Int. Cl........................................... H04l 27/00

[58] Field of Search .............. 325/38 A, 38 B, 38 R, 325/141–143, 322, 325; 328/111, 112, 114, 118, 119; 329/106, 107; 332/9 R, 11 R; 179/15.55; 178/DIG. 3, 66

[56] References Cited

UNITED STATES PATENTS 3,383,461  5/1968  Dryden ......................... 178/DIG. 3

Primary Examiner—Albert J. Mayer
Attorney—Baldwin, Wight and Brown

[57] ABSTRACT

A transmission system for transmitting information contained in a complex waveform includes a transmitter in which the individual slopes forming the complex wave and the duration of these slopes are determined and converted into coded signals. These signals are transmitted to a receiver in which the coded signals are used to produce an analogue signal corresponding to the complex wave.

9 Claims, 2 Drawing Figures

INVENTOR.
Alfred Brian Edwin Ellis
BY
Baldwin Wight Diller & Brown
ATTORNEYS

SYSTEM FOR PROCESSING SLOPE AND DURATION INFORMATION CONTAINED IN COMPLEX WAVEFORMS

This is a continuation-in-part application of an application of Alfred Brian Edwin Ellis entitled "SIGNAL INFORMATION TRANSMISSION SYSTEMS," Ser. No. 822,401, filed May 7, 1969.

This invention relates to signal information transmission systems.

It is frequently necessary to provide systems for transmitting signal information in, for example, television or radar systems where the information content is complex and the object of the present invention is to provide a signal information transmission system which is particularly suitable for the transmission of complex waveforms.

According to this invention a transmission system for transmitting information contained in a complex waveform comprises a transmitter in which the individual slopes forming the complex wave and the duration of these slopes are determined and converted into coded signals, which signals are then transmitted to a receiver in which the coded signals are used to produce an analogue signal corresponding to said complex wave.

A transmitter for use in such a system preferably includes means for determining the instantaneous slope of the waveform; a coder for producing coded signals representative of the slopes of the waveform, each individual coded signal covering an individual range of adjacent slopes; means for detecting when the slope of the waveform changes from one range to another; a timing circuit for determining the duration of time for which the waveform slope lies within a range of slopes; and means for transmitting coded signals representative of said individual coded signals and their duration.

Preferably the coded signals are in binary form.

Preferably the means for determining the instantaneous waveform slope is a differentiator and said coder comprises an analogue-to-digital converter.

Preferably the means for detecting when the slope of the waveform changes from one range to another comprises a detector which detects a change in the binary output of the analogue-to-digital converter.

Preferably the timing circuit comprises a digital counter and a source of clock pulses.

The transmitted coded signals may constitute a word or words, each word consisting of ten bits of which six bits represent the individual slope coded signals, one bit represents polarity of the slope and three bits represent duration information. However, it is frequently desirable to transmit two differing types of waveform information, one requiring a short duration steep slope waveform for which it is necessary to use a larger number of bits for the slope information and another requiring a long duration, low slope waveform for which it is necessary to use a larger number of bits for the duration information.

A transmitter in accordance with a preferred embodiment of the invention comprises a low slope detector to determine whether or not the slope is below a predetermined value; a long duration detector which determines if the count of the counter of said timing circuit is above a predetermined value; and means which apportions more bits of said word to the duration signal than it would normally occupy if the slope detector detects a low slope at the same time as the long duration detector detects a high timing count and which also produces a signal for insertion in said coded word to indicate the apportionment of the bits of the word to slope information and duration information.

With binary code and allowing only two possible apportionments of the bits the signal indicative of the apportionment may be simply a "1" or a "0."

In a practical case if the signal apportionment bit is a "1," seven bits would be used for slope information and two bits for duration, whereas if the first bit is a "0" three bits would be used for slope information and six bits for duration information.

A receiver for use in a transmission system in accordance with this invention includes means for decoding said transmitted coded signals into two signals, one representative of slope and the other of duration, switch means for feeding said signals representative of slope to an integrator, the switch means being controlled by said signals representative of the duration of the slope to pass slope representative signals to the integrator for a time equal to the duration of the original slope.

In a receiver in accordance with a preferred embodiment of the invention, the decoding means comprises an input register to store the incoming coded signal words, a word splitting unit connected to receive the output of said register and arranged to split the stored words into their slope representative portion and duration representative portion, a first digital-analogue converter to produce an analogue slope representative signal and a second digital-analogue converter to produce an analogue signal, the amplitude of which is representative of the duration of said slope, and an amplitude to time converter which produces an output pulse occupying a time equal to the duration of said slope, which pulse is used to control said switch means.

Figure 2:
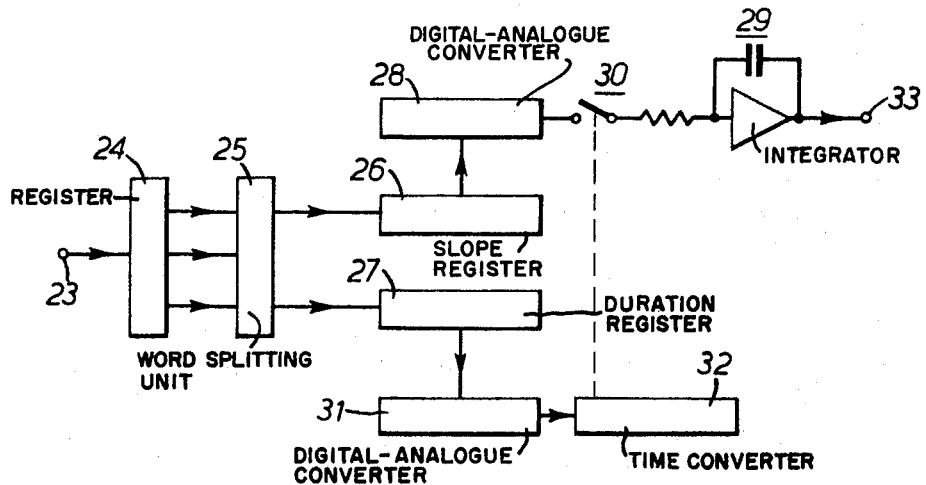

For a better understanding of the invention reference will now be made by way of example to the accompanying drawings in which:

FIG. 1 is a block diagrammatic circuit diagram of a transmitter for use in a transmission system in accordance with the invention, and FIG. 2 is a block diagrammatic circuit diagram of a receiver for use in a transmission system in accordance with the invention.

Referring to FIG. 1, complex waveform to be transmitted such as a television or radar signal is applied via input terminal 1 to a differentiating circuit 2 which produces an output signal having a level and polarity which is representative of the slope of the waveform. This signal is fed to an analogue-digital converter 3 which is triggered to make an analogue-digital conversion at time intervals determined by pulses from a clock pulse generator 4, the clock pulses being counted in a duration counter 5. The analogue-digital converter 3 has two outputs 6 and 7, output 6 being fed directly to a slope change detector 8 which is arranged to detect any change in the binary number fed thereto and to generate a signal to reset the duration counter 5 in the event of a change of slope, (represented by a change in the binary output of the analogue-digital converter 3) and output 7 being fed to a low slope detector 9, the output of which is connected to one input of an AND gate 10. The other input of the AND gate 10 is connected to the duration counter 5 via one output of a sense unit 11. The sense unit 11 is a simple logic circuit which may be, for example, a six input AND or NAND circuit having its inputs connected to appropriate Q and $\bar{Q}$ outputs of the counter 5 so as to produce a logic 1 output whenever the six stages of the counter 5 are in condition 000011. A suitable circuit which may be used for sense unit 11 is disclosed in Series 74, Bulletin No. DL–S 6710108, page 5012, Texas Instruments Incorporated, Dallas, Texas (1967) which discloses an eight-input positive NAND circuit. It will be understood, of course, that only six inputs would be used, the other two inputs being connected to a point of fixed potential. If desired, a comparator circuit in which two digital codes are compared may be used for sense unit 11. In this case, a counter code and a set of six D.C. levels representing 000011 from the counter 5 would be compared. A suitable type of comparator circuit is disclosed in *Fairchild Application Report*, "The Application of Diode Transistor Micrologic," 2nd Issue, page 29, April 1967. A second output of the sense unit 11 is connected to a delay unit 12, having a delay which is small with respect to the clock pulse rate and the output of which is connected to one terminal 13 of a two terminal switch 14. Signals are fed to the other terminal 15 of the switch 14 from the duration counter 5 via a second sense unit 16. The sense unit 16 may be a simple logic circuit identical to the logic circuit described above as suitable for use as the sense unit 11. In the case of sense unit 16, of course, the six active inputs of an AND circuit or NAND circuit would be connected to appropriate Q or $\bar{Q}$ outputs from the counter 5 so as to produce a logic 1 level output whenever the six stages of the counter 5 are in condition 111111. Similarly, a comparator circuit, identical to the comparator circuit described above as being suitable for use as sense unit 11 may be used for sense unit 16. In the case of sense unit 16, a counter code and a set of D.C. levels representing 111111 from the counter 5 would be compared. The switch 14 is controlled by a word control unit 17 (as is indicated by the chain line on the drawing) to pass a reset signal from either of the sense units 11 or 16 to the duration counter 5. The word control unit 17 generates, as three outputs, a control input for a three input switch 18 of a given level, a similar level to operate switch 14 and a third level to a 10-bit holding register 19 via a lead 20. The word control unit 17 may be a simple bistable circuit, having the aforementioned three outputs, which is set to one condition by an output from the AND gate 10 and to its other condition by the absence of an output from the AND gate 10 indicating the end of a word. Any number of well known bistable circuits could be used for word control unit 17. One suitable bistable circuit which may be used for word control unit 17 is disclosed in the *Fairchild Application Report*, "The Application of Diode Transistor Micrologic," 2nd Issue, page 41, FIG. 2.4.1, April 1967. When using the circuit illustrated in the above-mentioned FIG. 2.4.1, it will be appreciated, by those skilled in the art that the reset input R is obtained via an inverter connected between the set input S and the reset input R. In the drawing switch 14 is shown connecting sense register 11 to the duration counter 5.

Duration code information from the counter 5 is fed as one input to the three input switch unit 18 which receives slope code information on a second input from the analogue-digital converter 3 and an actuating signal on its third input from AND gate 10 via the word control unit 17.

Combined slope code and duration code information from switch unit 18 is fed into nine bit positions of a 10 bit holding register 19 which has its tenth bit position connected to the word control unit 17 over the lead 20.

A transmission register 22 is connected to receive a word from the holding register 19 and pass it to a transmission device (not shown), the transfer being initiated by a word ready pulse applied over a lead 21 to the transmission register 22 from the slope change detector 8.

A basic ten bit word code is used. When the slope is low only a few bits are required to code this information whereas when the slope is steep a higher number of bits are required. Similarly with a short duration a few bits and with a long duration a larger number of bits are needed. It is therefore desirable to allow for the transmission of two different waveform classifications each utilising only the same number of bits, the first being a short duration steep slope waveform of the type which occurs, for example, in sharply detailed areas of a television picture and the second being a long duration, low slope, waveform which occurs for example where monotonic background information of a television picture is being transmitted. To do this a code apportionment signal is transmitted preceding the slope and duration information to indicate the apportionment of the bits of the word between slope information and duration information. In the arrangement illustrated two different word apportionments are used, one, with the apportionment signal bit a "1," giving seven bits for the slope information and two bits for duration and the other with the apportionment signal bit a "0," giving three bits slope information and six bits duration. In either case one bit of the slope information indicates the polarity of the slope.

In operation a complex television waveform to be encoded is fed into the differentiating circuit 2 which produces an output level and polarity depending upon the input waveform slope. This level is converted to binary form by the analogue-digital converter 3 which is triggered to effect a conversion by clock pulses from clock pulse generator 4 to a time interval equivalent to one element of waveform information (i.e., one picture element of a television waveform). The binary output levels produced by the analogue-digital converter each represent distinct steps in analogue level and therefore each level has to be used to represent the range of analogue levels that exist between steps and which correspond to a small range of adjacent slopes. The duration counter 5 is also coupled to the clock pulse generator 4 and counts the clock pulses received between reset pulses from the switch 14 or from the slope change detector 8, each of which reset pulses sets the counter to zero.

After the detection of a new slope has occurred the counter 5 counts the clock pulses until the slope change detector 8 indicates the occurrence of a change of slope by transmitting a word ready pulse which also acts to reset counter 5 to zero. This assumes that the counter 5 has not already reached the maximum count possible with the apportioned number of bits for the duration information.

If, however, the slope is a long duration slope, then upon the counter reaching its maximum count it is reset to "0," the resulting word transmitted, containing the slope information and a maximum duration signal, and a new count started for the next word which will carry the same slope information. The detection of the maximum count is effected by one or other of the sense units 11 and 16 depending upon the signal and bit apportionment. To enable this detection to be carried out the count contained in the counter 5 is continuously fed to these two sensing units 11 and 16 and at the same time it is fed to the holding register 19 via switch unit 18 which, as will be hereinafter described, determines which register positions will be occupied by the duration and slope information.

As described above, either two bits, allowing a maximum duration count of three, or six bits, allowing a maximum duration count of sixty three, may be used for the duration information. To enable the choice to be made the word control unit 17 actuates switch 14 to cause a counter state of 000011 or 111111 to be sensed in the sense units 11 or 16 respectively (i.e., a two or a six bit code of "1"s). When the switch is in the normal position, i.e., in the position shown in the drawing on terminal 13, it provides sensing of the two bit code of 000011 by sense unit 11. The slope code from the analogue-digital converter 3 is also continuously fed to the holding register 19 via switch unit 18. If the counter 5 reaches this code before a change of slope causes a reset, the sensing unit 11 will generate a reset or "word ready pulse" which is sent to reset the counter 5 and to operate the transmission register 22. In the switch unit 18, with the switch 14 in its normal position, the seven bit binary slope code and the two bit duration code are routed to the register positions in the holding register to form a nine bit word in the ten bit holding register, the tenth bit being supplied as a "0" by the word control unit which completes the registered word and indicates that the normal apportionment is being utilized.

When the low slope detector 9 detects a slope which has a level code less than three it feeds a "1" to one input of the AND gate 10. If then the second input of the AND gate 10 receives a "1" from the sensing unit 11 indicating that the duration counter 5 has reached a count of 000011, the AND gate produces an output signal which is fed to word control unit 17 and this unit then causes switch 14 to switch to position 15. At the same time the word control unit 17 feeds an output signal to switching unit 18 to control the routing of information signals therein. This switching unit then routes the slope code to three bit positions of the register and the duration code to six bits of the register. The word control unit 17 feeds a "1" into the tenth bit position of the holding register to indicate the altered apportionment of the word bits. To prevent the output from sense 11 from resetting the counter 5 the delay unit 12 delays this output for sufficient time to allow switch 14 to reset to position 15 before this output arrives at terminal 13. It should be noted that the delay is arranged to be small with respect to the clock pulse rate to avoid missing out a waveform element. With the switch 14 set to position 15 and provided a change of level does not occur the counter 5 is not reset until a count of 111111 has been reached and detected by sense unit 16. When a word ready pulse or reset pulse is generated by the slope change detector 8 or by either of the sense units 11 and 16 and is applied over lead 21 to the transmission register 19 the ten bit word is transferred from the holding register 19 to the transmission register 22 which then feeds the word bits serially to a transmission device for utilisation. Whilst the transmission register 22 is emptying the holding register is available for storing new information.

In the receiver shown in FIG. 2, a binary code or word as transmitted from the transmitter of FIG. 1 is received at input terminal 23 and fed into an input register 24. Information from register 24 is fed to a word splitting unit 25 which is controlled by the first bit or apportionment bit of the word in the binary code to feed the bits as apportioned to a slope register 26 and a duration register 27. The word splitter unit 25 is essentially an electronic multi-pole two-way switch which may take the form of a simple logic circuit. In one position, with a 1 condition in the first bit, seven bits are selected and fed to the slope register 26 while the remaining two bits are selected and fed to the duration register 27. In the other position, with a 0 condition in the first bit, three bits are selected and fed to the slope register 26 while the remaining six bits are fed to the duration register 27. The word splitter unit 25 may conveniently take the form of two sets of AND gates each consisting of nine AND gates. One set of nine AND gates would have their respective control inputs connected to receive an input from the Q output from the first stage of input register 24 holding the first bit, with each of the other inputs to the one set of nine AND gates being connected respectively to the Q outputs from each of the stages of the input register 24 holding second to tenth bits. The other set of nine AND gates would have their respective control inputs connected to receive an input from the $\bar{Q}$ output from the first stage of input register 24 holding the first bit, with each of the other inputs to the said other set of nine AND gates being connected respectively to the Q outputs from each of the stages of the input register 24 holding second to tenth bits. As will be appreciated by those skilled in the art, in the case in which the input register 24 is of the type in which each of the stages has only one output, the second set of nine AND gates may have their controlling outputs connected to the output of the stage containing the first bit via an inverter. Output from the slope register 26 is then decoded in a digital-analogue converter 28 and passed in analogue form to an integrator 29 via a switch 30. Similarly output from the duration register 27 is decoded in a digital-analogue converter 31 which provides an analogue voltage of amplitude proportional to the number of clock pulses represented by the duration signal. This voltage is then applied to an amplitude to time converter 32 which may be a simple monostable circuit which produces a pulse of determined width on receiving a trigger, the duration of the pulse being porportional to the voltage applied to a timing circuit. Such circuits are well known as modulators for pulse width modulation systems. An example of a suitable circuit of the type usable as the amplitude to time converter 32 is described and illustrated in *Solid State Design*, "Using Integrated Circuits as Monostable Multivibrators," pages 11–15, July, 1965. Another suitable circuit of the type usable as the amplitude to time converter 32 is described in *Electronic Design*, "Widen Multivibrator Ranges by Separating Timing and Biasing," pages 66–69, April 1966. An alternative solution for providing a suitable circuit for the amplitude to time converter is to provide a circuit in which a capacitor is charged by a sequence of pulses of fixed time interval. When the voltage on the capacitor equals that from the digital analogue-analogue converter 31, the output of the amplitude to time converter 32 opens the switch 30 and the circuit is reset. The larger the voltage required, the more pulses are needed and the longer the time required to reach the required voltage. Such a circuit requires a voltage comparator, a source of pulses and a capacitor. The amplitude to time converter is effective to produce a pulse whose length is such as to occupy the same time as the slope and which corresponds to said number of clock pulses. This pulse is then used to close switch 30 and provide an input to integrator 29 to produce the slope for that length of time. At the end of the pulse, switch 30 is opened and integrator 29 holds its level until the next word is received. Output from the integrator which is taken off at terminal 33 will therefore be a straight line reproduction of the original waveform. The accuracy of reproduction depends to a large extent upon magnitude of the range of slopes which each individual binary coded slope level is required to represent and the degree of fineness or otherwise of time measurement provided by the clock pulse source.

Many other forms of circuitry could be employed to achieve the necessary coding of the slope level and directions. If a very simple circuit were required the means of varying the apportionment of the bits of the code word between slope and duration could be dispensed with. In this case an extra bit would then be available for either slope or duration information as desired.

What is claimed is:

1. A system for processing information contained in a complex waveform having individual slopes of given durations comprising a transmitter including means responsive to the complex waveform for developing coded signals representative of said individual slopes, means responsive to said complex waveform for developing coded signals representative of said given durations, and means for transmitting said coded signals representative of said individual slopes and said coded signals representative of said given durations to a receiver; said receiver including means responsive to said coded signals representative of said individual slopes and said coded signals representative of said given durations for producing an analogue signal corresponding to said complex waveform.

2. The system according to claim 1 wherein said means responsive to said complex waveform for developing coded signals representative of said individual slopes comprise means responsive to said complex waveform for developing a signal representative of instantaneous slope of said complex waveform, and a coder means responsive to said signal representative of said instantaneous slope for producing individual coded signals representative of slopes of the complex waveform, each individual coded signal covering an individual range of adjacent slopes; and further including means responsive to said complex waveform for detecting when the slope of the complex waveform changes from one range to another, and a timing circuit means responsive to an output from said means for detecting when the slope of the complex waveform changes from one range to another for determining the duration of time for which the slope of the complex waveform lies within a range of slopes.

3. The system according to claim 1 wherein said means for developing coded signals representative of said individual slopes and said means for developing coded signals representative of said given durations are means for developing coded signals in binary form.

4. The system according to claim 2 wherein said means for developing a signal representative of instantaneous slope of said complex waveform comprises a differentiating circuit means, and said coder means comprises an analogue-to-digital converter having an output in binary form.

5. The system according to claim 4 wherein said means for detecting when the slope of the complex waveform changes from one range to another comprises means responsive to said output in binary form for detecting change in the output of the analogue-to-digital converter.

6. The system according to claim 5 wherein said timing circuit means comprises a source of clock pulses, a digital counter coupled to said source of clock pulses and responsive to clock pulses therefrom, said digital counter being coupled to said means for detecting when the slope of the complex waveform changes from one range to another for receiving a re-set signal therefrom.

7. The system according to claim 6 including means responsive to said compelx waveform for determining if the instantaneous slope of said complex waveform is below a predetermined value; means responsive to count output from said digital counter for determining if the count of the digital counter is above a predetermined value; and means responsive concurrently to an output from the means for determining if the instantaneous slope is below a predetermined value and an output from said means for determining if the count of the digital counter is above a predetermined value for apportioning bits of at least one word between at least one of said coded signals representative of at least one of said given durations and at least one of said coded signals representative of at least one of said individual slopes, and for producing and inserting a signal in said at least one word to indicate apportionment of bits of said at least one word to slope information and duration information.

8. The system according to claim 1 wherein said means for producing an analogue signal corresponding to said complex waveform comprises decoding means responsive to said coded signals for producing one signal representative of the individual slopes of the complex waveform and another signal representative of the given durations, an integrating means, and switch means responsive to said another signal for selectively feeding said one signal to said integrating means for time durations equal to the given durations.

9. The system according to claim 8 wherein said means for transmitting said coded signals includes means for producing a series of signal words, each word containing a signal representative of an individual slope and a signal representative of a given duration; said decoding means comprises an input register for storing incoming signal words, a word splitting means coupeld to said input register for splitting stored signal words received therefrom into their slope representative portion and duration representative portion, a first digital-to-analogue converter means responsive to the slope representative portion of said stored signal words for producing an analogue slope representative signal, a second digital-to-analogue converter means responsive to the duration representative portion of said stored signal words for producing an analogue duration representative signal, and a converter means responsive to said duration representative signal for producing output pulse signals each pulse of which has a duration equal to one of said given durations, said switch means being controlled by said output pulse signals.

* * * * *